US012548244B2

(12) United States Patent
Tian et al.

(10) Patent No.: US 12,548,244 B2
(45) Date of Patent: Feb. 10, 2026

(54) METHOD AND APPARATUS FOR PROCESSING ACTION OF VIRTUAL OBJECT, AND STORAGE MEDIUM

(71) Applicant: BEIJING SOGOU TECHNOLOGY DEVELOPMENT CO., LTD., Beijing (CN)

(72) Inventors: Kai Tian, Beijing (CN); Wei Chen, Beijing (CN); Xuefeng Su, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 224 days.

(21) Appl. No.: 18/139,929

(22) Filed: Apr. 26, 2023

(65) Prior Publication Data

US 2023/0368461 A1   Nov. 16, 2023

Related U.S. Application Data

(63) Continuation of application No. PCT/CN2022/100369, filed on Jun. 22, 2022.

(30) Foreign Application Priority Data

Jul. 7, 2021  (CN) .......................... 202110770548.4

(51) Int. Cl.
   *G06T 17/00*  (2006.01)
   *G06V 10/24*  (2022.01)
   (Continued)

(52) U.S. Cl.
   CPC ............. *G06T 17/00* (2013.01); *G06V 10/24* (2022.01); *G06V 10/44* (2022.01); *G06V 10/54* (2022.01); *G06V 10/761* (2022.01); *H04N 5/265* (2013.01)

(58) Field of Classification Search
   CPC ........ G06T 17/00; G06V 10/24; G06V 10/44; G06V 10/54; G06V 10/761; G06V 10/82;
   (Continued)

(56) References Cited

U.S. PATENT DOCUMENTS 9,875,242 B2 * 1/2018 Poiesz ..................... G06F 16/40
10,911,775 B1   2/2021 Zhu et al.
(Continued)

FOREIGN PATENT DOCUMENTS

CN   104038705 A   9/2014
CN   107529091 A   12/2017
(Continued)

OTHER PUBLICATIONS

Stoll, C., Gall, J., De Aguiar, E., Thrun, S., & Theobalt, C. (2010). Video-based reconstruction of animatable human characters. ACM Transactions on Graphics (TOG), 29(6), 1-10.*
(Continued)

*Primary Examiner* — Sarah Lhymn
(74) *Attorney, Agent, or Firm* — Morgan, Lewis & Bockius LLP (57) ABSTRACT

A method and apparatus for processing an action of a virtual object, and a storage medium are provided. The method specifically includes: receiving an action instruction, the action instruction including: an action identifier and time-dependent information of performing an action associated with the action identifier; determining an action video frame sequence corresponding to the action identifier; determining, from the action video frame sequence, an action state image corresponding to a preset state image of the virtual object at a target time, the target time being determined according to the time-dependent information; generating a connection video frame sequence according to the action state image, the connection video frame sequence connecting the preset
(Continued)

state image with the action video frame sequence; and splicing the connection video frame sequence with the action video frame sequence, to obtain an action video. Embodiments of this application can improve action processing efficiency of a virtual object.

17 Claims, 5 Drawing Sheets

(51) Int. Cl.
*G06V 10/44* (2022.01)
*G06V 10/54* (2022.01)
*G06V 10/74* (2022.01)
*H04N 5/265* (2006.01)

(58) Field of Classification Search
CPC ............... G06V 20/49; H04N 5/265; H04N 21/440236; G11B 27/031
See application file for complete search history.

(56) References Cited

U.S. PATENT DOCUMENTS

| | | | |
|---|---|---|---|
| 2012/0180084 A1 | 7/2012 | Huang et al. | |
| 2013/0060572 A1* | 3/2013 | Garland | G11B 27/10 704/E15.005 |
| 2013/0066816 A1 | 3/2013 | Shimomura et al. | |
| 2014/0176603 A1* | 6/2014 | Kumar | G06F 3/011 345/633 |
| 2014/0310595 A1* | 10/2014 | Acharya | G06F 3/011 715/706 |
| 2016/0037067 A1 | 2/2016 | Lee et al. | |
| 2018/0349108 A1* | 12/2018 | Brebner | H04W 4/80 |
| 2020/0380769 A1 | 12/2020 | Liu et al. | |
| 2021/0118151 A1* | 4/2021 | Abdelhak | H04N 21/440281 |
| 2022/0319169 A1* | 10/2022 | Sim | G06V 20/42 |

FOREIGN PATENT DOCUMENTS

| | | | |
|---|---|---|---|
| CN | 108304762 A | | 7/2018 |
| CN | 108320021 A | | 7/2018 |
| CN | 108665492 A | | 10/2018 |
| CN | 109637518 A | | 4/2019 |
| CN | 110148406 A | | 8/2019 |
| CN | 110347867 A | | 10/2019 |
| CN | 110378247 A | | 10/2019 |
| CN | 111369687 A | | 7/2020 |
| CN | 111508064 A | | 8/2020 |
| CN | 111833439 A | | 10/2020 |
| CN | 112040327 A | | 12/2020 |
| CN | 112101196 A | | 12/2020 |
| CN | 112233210 A | | 1/2021 |
| CN | 113642394 A | | 11/2021 |
| WO | WO-2017124116 A1 * | | 7/2017 |

OTHER PUBLICATIONS

Yao, B. Z., Nie, B. X., Liu, Z., & Zhu, S. C. (2013). Animated pose templates for modeling and detecting human actions. IEEE transactions on pattern analysis and machine intelligence, 36(3), 436-452.*

Gleicher, M., Shin, H. J., Kovar, L., & Jepsen, A. (2008). Snap-together motion: assembling run-time animations. In ACM SIGGRAPH 2008 classes (pp. 1-9).*

Tencent Technology, Extended European Search Report, EP Patent Application No. 22836714.0, Jul. 29, 2024, 8 pgs.

Ashish Verma et al., "Animating Expressive Faces Across Languages", IEEE Transactions on Multimedia, vol. 6, No., 6, DOI: 10.1109/TMM.2004.837256, Dec. 2004, 10 pgs.

Feng Xu et al., "Video-Based Characters—Creating New Human Performances from a Multi-View Video Database", Special Interest Group on Computer Graphics and Interactive Techniques Conference (SIGGRAPH), DOI: 10.1145/1964921.196492, Jul. 2011, 10 pgs.

Masaki Oshita, "Generating Animation from Natural Language Texts and Framework of Motion Database", IEEE, 2009 International Conference on CyberWorlds, DOI: 10.1109/CW.2009.46, Sep. 2009, 8 pgs.

Tencent Technology, ISR, PCT/CN2022/100369, Aug. 9, 2022, 3 pgs.

Adrien Gaidon et al., "Virtual Worlds as Proxy for Multi-Object Tracking Analysis", Proceedings of the IEEE Conference on Computer Vision and Pattern Recognition (CVPR), http://www.xrce xerox.com/Research-Development/Computer-Vision/Proxy-Virtual-Worlds, 2016, 10 pgs.

Tencent Technology, WO, PCT/CN2022/100369, Aug. 9, 2022, 5 pgs.

Tencent Technology, IPRP, PCT/CN2022/100369, Dec. 14, 2023 6 pgs.

Beijing Sogou Technology Development Co., Ltd., Indian Office Action, IN Patent Application No. 202337060424, May 7, 2025, 8 pgs.

* cited by examiner

METHOD AND APPARATUS FOR PROCESSING ACTION OF VIRTUAL OBJECT, AND STORAGE MEDIUM

CROSS-REFERENCE TO RELATED APPLICATIONS

This application is a continuation application of PCT Patent Application No. PCT/CN2022/100369, entitled "METHOD AND APPARATUS FOR PROCESSING ACTION OF VIRTUAL OBJECT, AND STORAGE MEDIUM" filed on Jun. 22, 2022, which claims the priority of Chinese Patent Application No. 202110770548.4, entitled "METHOD AND APPARATUS FOR PROCESSING ACTION OF VIRTUAL OBJECT, AND STORAGE MEDIUM" and filed on Jul. 7, 2021, all of which is incorporated herein by reference in its entirety.

FIELD OF THE TECHNOLOGY

This application relates to the field of communication technologies, and in particular to a method and apparatus for processing an action of a virtual object, and a storage medium.

BACKGROUND OF THE DISCLOSURE

With the development of communication technologies, virtual objects can be widely used in scenes such as a broadcast scene, a teaching scene, a medical scene, and a customer service scene. The broadcast scene is taken as an example, a virtual object can replace a media worker to broadcast news, explain games, or the like.

In practical applications, a virtual object usually needs to perform some actions. At present, an action processing process of a virtual object in a related technology usually includes the following steps: First, a user provides key point information of a human body according to a time sequence. Then, the user inputs the above key point information to a generative adversarial network (GAN) to generate action video frames in an action video. The action video frames in the action video are then spliced according to the time sequence to obtain a corresponding action video.

In the related technology, generation of an action video costs more time, which makes action processing efficiency relatively low.

SUMMARY

Embodiments of this application provide a method and apparatus for processing an action of a virtual object, and a storage medium, which can improve action processing efficiency of a virtual object.

This application discloses a method for processing an action of a virtual object, the method being implemented by a computer device, and the method including:
  receiving an action instruction, the action instruction including: an action identifier and time-dependent information of performing an action associated with the action identifier;
  determining an action video frame sequence corresponding to the action identifier;
  determining, from the action video frame sequence, an action state image corresponding to a preset state image of the virtual object at a target time, the target time being determined according to the time-dependent information;
  generating a connection video frame sequence according to the action state image, the connection video frame sequence connecting the preset state image with the action video frame sequence; and
  splicing the connection video frame sequence with the action video frame sequence, to obtain an action video.

According to another aspect, this application discloses an apparatus for processing an action of a virtual object, including:
  an instruction receiving module, configured to receive an action instruction, the action instruction including: an action identifier and time-dependent information of performing an action associated with the action identifier;
  an action video frame sequence determining module, configured to determine an action video frame sequence corresponding to the action identifier;
  an image pair determining module, configured to determine, from the action video frame sequence, an action state image corresponding to a preset state image of the virtual object at a target time, the target time being determined according to the time-dependent information;
  a generation module, configured to generate a connection video frame sequence according to the action state image, the connection video frame sequence connecting the preset state image with the action video frame sequence; and
  a splicing module, configured to splice the connection video frame sequence with the action video frame sequence, to obtain an action video.

In still another aspect, this application discloses an apparatus (or referred to as a computer device) for processing an action of a virtual object, including a memory, and one or more programs. The one or more programs are stored in the memory, and the programs, when executed by one or more processors, cause the computer device to perform the steps of the foregoing method.

In yet another aspect, this application discloses a non-transitory computer-readable storage medium, which stores instructions (or a program). The instructions (or the program), when executed by one or more processors of a computer device, cause the computer device to perform the steps of the foregoing method.

In still yet another aspect, this application discloses a computer program product, including a program, the program being stored in a computer-readable storage medium, and the processor reading and executing the program from the computer-readable storage medium to perform the steps of the foregoing method.

The embodiments of this application include the following advantages:

When determining a preset state image of the virtual image at target time and an action video frame sequence corresponding to an action identifier, the embodiments of this application determine an image pair corresponding to the preset state image and the action state image which are matched with each other, and generate a connection video frame sequence according to the image pair. The connection video frame sequence can achieve a connection effect and a transition effect between the preset state image and the action video frame sequence, to improve the continuity between a preset state and an action state. Further, the connection video frame sequence is spliced with the action video frame sequence, so that a corresponding action video can be obtained.

By applying the technical solutions of the embodiments of this application, a user can trigger corresponding action instructions by inputting the action identifier and the time-dependent information. Inputting the action identifier and the time-dependent information can reduce a time cost and an operation difficulty of the user, so that the action processing efficiency for the virtual object can be improved.

In addition, the embodiments of this application generate the connection video frame sequence that achieves the connection effect and the transition effect in case of determining the preset state image and the action video frame sequence. Since the action video frame sequence can be from pre-collected and pre-stored action videos, a range of the generated video is specifically the connection video frame sequence, so the embodiments of this application can reduce a time length of the generated video. Therefore, the action processing efficiency for the virtual object can be further improved.

DESCRIPTION OF EMBODIMENTS

To make the foregoing objectives, features, and advantages of this application clearer and easier to understand, the following further describes this application in detail with reference to the accompanying drawings and specific implementations.

In the embodiments of this application, a virtual object is a vivid and natural object that is close to a real object and is obtained by object modeling, action capturing and other technologies. A virtual object can have recognition, understanding and expression abilities by an artificial intelligence technology such as speech recognition and natural language understanding. Virtual objects specifically include: a virtual character, a virtual animal, a three-dimensional cartoon object, and the like.

For example, in a broadcast scene, a virtual object can replace a media worker to broadcast news, explain games, or the like. In a specific implementation, a virtual object can express a text. The embodiments of this application can generate a video corresponding to a text and a virtual object. The video may specifically include: a speech sequence corresponding to the text, and a video frame sequence corresponding to the speech sequence.

According to a state corresponding to the virtual object, the video frame sequence corresponding to the speech sequence can be divided into: a preset state image or an action state image.

The preset state image may correspond to preset states of the virtual object when the virtual object does not perform an action. In a specific implementation, a preset state image sequence with a preset time length can be preset. The preset state image sequence is played circularly when the virtual object does not perform an action. For example, preset states of a virtual live stream host when the virtual live stream host does not perform an action include: arms down, lips closed, eyes showing a neutral expression, and the like.

The action state image may correspond to action states of the virtual object when the virtual object performs an action. For example, preset states of a virtual live stream host when the virtual live stream host performs a greeting action include: arms swinging left and right, lips opened at a preset angle, eyes showing a smile expression, and the like.

In a related technology, in a process of generating an action video, a user provides key point information of a human body, which increases a time cost and an operation difficulty of the user, and makes the action processing efficiency relatively low. Furthermore, action video frames contained in an action video in the related technology are all generated by a GAN, so that generation of the action video also costs more time, which also makes action processing efficiency relatively low.

For the technical problem of how to improve the action processing efficiency for the virtual object, this embodiment of this application provides a scheme for processing an action of a virtual object. The scheme specifically includes: receiving an action instruction, the action instruction specifically including: an action identifier and time-dependent information of performing an action associated with the action identifier; determining an action video frame sequence corresponding to the action identifier; determining, from the action video frame sequence according to a preset state image of a virtual object at target time, an action state image corresponding to the preset state image, the target time being determined according to the time-dependent information; generating a connection video frame sequence according to the preset state image and the action state image, the connection video frame sequence being used for connecting the preset state image with the action video frame sequence; and splicing the connection video frame sequence with the action video frame sequence, to obtain an action video.

In the embodiments of this application, the action instruction of a user carries the action identifier and the time-dependent information. The action identifier is used for determining a corresponding action video frame sequence. The action video frame sequence can be from pre-collected and pre-stored action videos. The time-dependent information is used for determining target time corresponding to the preset state image.

When determining a preset state image of the virtual image at target time and an action video frame sequence corresponding to an action identifier, the embodiments of this application determine an image pair corresponding to the preset state image and the action state image which are matched with each other, and generate a connection video frame sequence according to the image pair. The connection video frame sequence can achieve a connection effect and a transition effect between the preset state image and the action video frame sequence, to improve the continuity between a preset state and an action state. Further, the connection video frame sequence is spliced with the action video frame sequence, so that a corresponding action video can be obtained.

By applying the technical solutions of the embodiments of this application, a user can trigger corresponding action instructions by inputting the action identifier and the time-dependent information. Inputting the action identifier and the time-dependent information can reduce a time cost and an operation difficulty of the user, so that the action processing efficiency for the virtual object can be improved.

In addition, the embodiments of this application generate the connection video frame sequence that achieves the connection effect and the transition effect in case of determining the preset state image and the action video frame sequence. Since the action video frame sequence can be from pre-collected and pre-stored action videos, a range of the generated video is specifically the connection video frame sequence, so the embodiments of this application can reduce a time length of the generated video. Therefore, the action processing efficiency for the virtual object can be further improved.

For example, if a user selects an action identifier X at a text content A, it can be considered that an action instruction I includes: the action identifier X and time-dependent information (the position of the text content A). A processing process of the action instruction I may include: retrieving an action video frame sequence corresponding to an action identifier X by using video retrieval and other manners; determining target time and a preset state image of the virtual object at the target time according to the position of the text content A; determining, from the action video frame sequence, an action state image corresponding to the preset state image; generating a connection video frame sequence according to the preset state image and the action state image; and splicing the connection video frame sequence with the action video frame sequence. The spliced video frame sequence obtained in the embodiments of this application can correspond to a speech sequence corresponding to the text content A. For example, the spliced video frame sequence and the speech sequence corresponding to the text content A can be aligned in time axis to achieve synchronous playing.

In practical applications, the text to speech (TTS) technology can be used to convert a text into a speech sequence. The speech sequence may be characterized as a waveform. It is understood that a speech sequence that meets requirements can be obtained according to speech synthesis parameters.

In some embodiments, the speech synthesis parameters may include: at least one of a tone parameter, a pitch parameter and a loudness parameter.

The tone parameter may refer to distinctive characteristics of different voice frequencies in waveforms. Usually, different sounding objects correspond to different tones. Therefore, a speech sequence that matches the tone of a target sounding object can be obtained according to the tone parameter. The target sounding object may be specified by the user. For example, the target sounding object may be a specified media worker, or the like. In practical applications, the tone parameter of the target sounding object may be obtained according to an audio with a preset length of the target sounding object.

The pitch parameter may represent a pitch, which is measured in frequency. The loudness parameter is also referred to as a sound intensity or volume, and may refer to an amplitude of sound, which is measured in decibels (dB).

The method for processing an action of a virtual object provided by the embodiments of this application can be applied to an application environment including a client and a server. The client and the server are located in a wired or wireless network, by which, the client and the server perform data interaction.

In some embodiments, the client may run on a terminal device, which specifically includes but is not limited to: a smart mobile phone, a tablet computer, an e-book reader, a Moving Picture Experts Group Audio Layer III (MP3) player, a Moving Picture Experts Group Audio Layer IV (MP4) player, a laptop portable computer, a vehicle-mounted computer, a desktop computer, a set-top box, a smart television, a wearable device, and the like.

The client refers to a program corresponding to the server and providing a local service for a user. The client in the embodiments of this application can receive the action instruction and provide the spliced video frame sequence corresponding to the action instruction. The spliced video frame sequence may be generated by the client or the server. The embodiments of this application do not limit a specific generation subject of the spliced video frame sequence.

In one embodiment of this application, the client may receive a text and an action instruction of a user, and upload the text, information of a target sounding object and the action instruction to the server, so that the server generates a target video corresponding to the text, the target sounding object and the action instruction. In addition, the client may output the target video to the user. The target video may include: the aforementioned spliced video frame sequence.

The server may be one server, also referred to as a server-side, a server cluster including a plurality of servers, or a cloud computing service center. The server is configured to provide a background service to the client.

Figure 1:
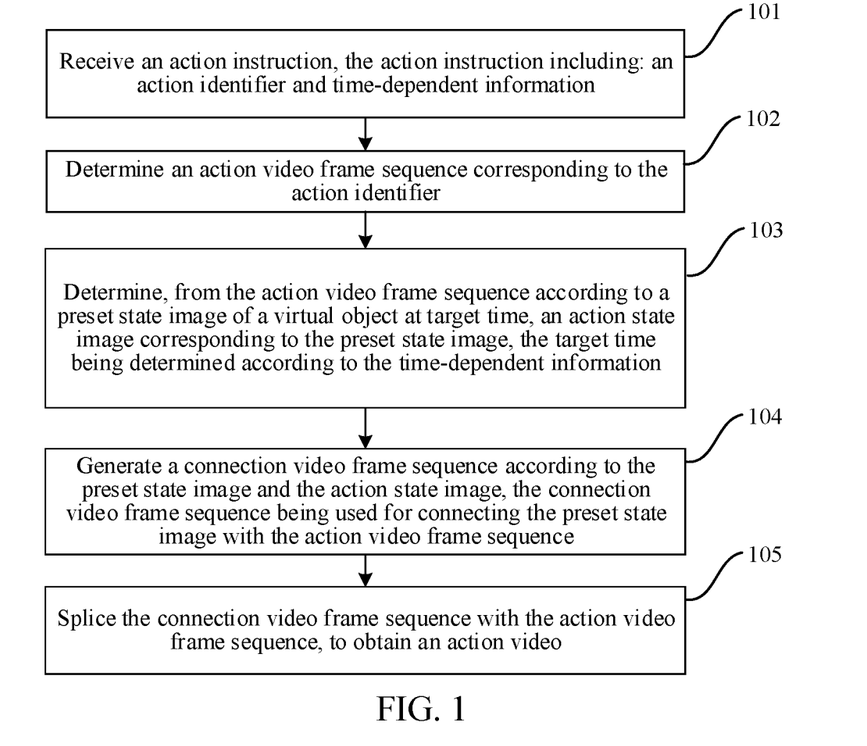
FIG. 1 is a flowchart of steps of a method for processing an action of a virtual object provided by an embodiment of this application.

FIG. 1 shows a flowchart of steps of a method for processing an action of a virtual object provided by an embodiment of this application. The method may specifically include the following steps:

Step 101: Receive an action instruction. The action instruction may include: an action identifier and time-dependent information of performing an action associated with the action identifier;

Step 102: Determine an action video frame sequence corresponding to the action identifier.

Step 103: Determine, from the action video frame sequence, an action state image corresponding to a preset state image of the virtual object at a target time, the target time being determined according to the time-dependent information.

Step 104: Generate a connection video frame sequence according to the action state image, the connection video frame sequence connecting the preset state image with the action video frame sequence.

Step 105: Splice the connection video frame sequence with the action video frame sequence, to obtain an action video.

At least one step of this embodiment shown in FIG. 1 may be executed by a server. Certainly, this embodiment of this application does not limit specific execution subjects of the various steps.

In step 101, a client may receive the action instruction inputted by a user and send the action instruction to the server.

In practical applications, the client may provide a user interface (UI) for the user to input the action instruction. For example, the user interface may include: a text content. If the user selects a text content A and selects an action identifier X, it can be considered that the action instruction I includes: the action identifier X and time-dependent information (the position of the text content A). The action instruction I may represent that: a virtual object performs an action corresponding to the action identifier X in a process of expressing the text content A. For example, the text content A is "Nice to meet you", and the action identifier X is "Greeting", etc.

The action identifier may be used to identify an action. For example, the action identifier may be the name of the action. Examples of the action identifier may include: greeting, bowing, smiling, showing items, signing, and the like.

The time-dependent information may be related to time of an action in a video. In some embodiments, the time-dependent information includes: text information corresponding to the action identifier. For example, a text content corresponding to an action may be specified, and the position of the text content may be used as the time-dependent information.

Certainly, the position of the text content is only an example of the time-dependent information. In fact, persons skilled in the art can use other time-dependent information according to actual application requirements. For example, the time-dependent information may also be: time information of an action in a video, which may represent performing a certain action in a specific period of time. The time information may include: start time information, end time information, and the like.

In step 102, the action video may be collected in advance according to the action identifier, and the collected action video and its corresponding action identifier are stored to an action video library. Collection manners of an action video may include but are not limited to: web crawling, cooperation with video operators, recording, and the like. For example, corresponding action videos can be recorded for virtual objects and action identifiers.

In practical applications, an action video frame sequence corresponding to an action identifier may be retrieved by using video retrieval and other manners. Specifically, according to the action identifier, the action video library is retrieved to obtain the action video frame sequence corresponding to the action identifier.

In step 103, the target time may be before an action. Further, the target time may also be adjacent to an action. The above target time may be determined according to the time-dependent information. Assuming that the time-dependent information is the position of the text content, start time information $T_i$ of the action may be determined according to the position of the text content, and time information $T_{(i-1)}$ before and adjacent to the start time information $T_i$ may be determined as the target time. Certainly, time information $T_{(i-2)}$ may be determined as the target time. This embodiment of this application does not limit whether the target time is adjacent to the action.

In a specific implementation, the target time may be matched with time information in a preset state image sequence, to obtain a preset state image of the virtual object at the target time. It is understood that this embodiment of this application does not limit a specific determining manner of the preset state image of the virtual object at the target time.

When the preset state image of the virtual object at the target time and the action video frame sequence corresponding to the action identifier are determined, an image pair corresponding to the preset state image and the action state image which are matched with each other can be determined. The action video frame sequence usually includes a plurality of action state images. This embodiment of this application can determine, from the plurality of action state images, one action state image that matches the preset state image.

According to one implementation, a similarity value between the preset state image and each action state image in the action video frame sequence may be determined, and the action state image with a maximum similarity value is used as the action state image corresponding to the preset state image.

In practical applications, a first image feature and a second image feature corresponding to the action state image in the action video frame sequence may be extracted separately from the preset state image, and the above similarity value may be determined according to the first image feature and the second image feature.

Categories of the first image feature and the second image feature may include: at least one of a color feature, a texture feature, a shape feature, a spatial relationship feature and a visual feature.

The visual feature may be a feature of a preset part corresponding to the virtual object. The action state image that matches the preset state image is determined on the basis of the feature of the preset part corresponding to the virtual object, which can achieve the matching of the preset state image and the action state image in the preset part.

In practical applications, the preset part may be a part related to the action. For example, the preset part may specifically include: the face, the neck, the limbs, and the like. The face may include: the lip, the noise, the eyes, and the like. The limbs may further include: the four limbs, such as an arm part.

In one implementation, a determining manner of the visual feature may include: determining a region image corresponding to the virtual object from the preset state image or the action state image; and extracting a visual feature of a preset part from the region image as the visual feature corresponding to the preset state image or the action state image. That is, a region image corresponding to the virtual object is determined from the preset state image, and a visual feature of the preset part is extracted from the region image as the visual feature corresponding to the preset state image. That is, a region image corresponding to the virtual object is determined from the action state image, and a visual feature of the preset part is extracted from the region image as the visual feature corresponding to the action state image.

In practical applications, a region image corresponding to the virtual object may be first extracted from the preset state image or the action state image by using an image matting technology. For example, the region image includes: a face region image and a limbs region image. The virtual feature of the preset part may be separately extracted from the face region image and the limbs region image. In some embodiments, a face processing module may be used to extract the visual features of the preset part such as the lip, the noise and the eyes from the face region image. Alternatively, a limbs processing module may be used to extract the visual features of the preset part such as the four limbs from the limbs region image.

The face processing module and the limbs processing module can be implemented through a neural network. Examples of the neural network may include: a convolutional neural network, a deep residual network, or the like. The convolutional neural network uses a convolution kernel to extract the visual feature. In a back-propagation stage, parameters of the convolution kernel can be updated according to a set target, so the accuracy and robustness of extracting features by the convolution kernel can be improved. One of the characteristics of the deep residual network is easy optimization, and the accuracy can be improved by increasing a considerable depth. An internal residual block uses jump connection, which alleviates the problem of gradient disappearance caused by an increase in depth in the neural network. It is understood that this embodiment of this application does not limit a specific neural network corresponding to the face processing module and the limbs processing module.

In this embodiment of this application, the visual feature of the preset part that is extracted from the region image may be referred to as a first visual feature, which may be sparse.

In order to improve a density of the visual feature, in an embodiment of this application, three-dimensional reconstruction can be performed on an image of the preset part may be according to the first visual feature (that is, the visual feature of the preset part extracted from the above region image), to obtain a dense visual feature of the preset part. This dense visual feature may be referred to as a second visual feature. In practical applications, the first visual feature corresponds to a plurality of preset parts, and the three-dimensional reconstruction may be performed for some or all of the preset parts. For example, the three-dimensional reconstruction may be performed on an arm part. Compared with the first visual feature, the second visual feature obtained on the basis of the three-dimensional reconstruction contains more dense information, so the second visual feature is denser.

When using a visual feature to determine an image pair, the determining a corresponding action state image from the action video frame sequence may specifically include: matching a visual feature corresponding to the preset state image with visual features corresponding to action state images in the action video frame sequence, to obtain the action state image corresponding to the preset state image. Specifically, a match value between the visual features may be determined, and an action state image with a maximum match value is used as the action state image corresponding to the preset state image.

In a specific implementation, various visual features may be fused to obtain a fused visual feature. Further, the fused visual feature corresponding to the preset state image may be matched with the fused visual features corresponding to the various action state images in the action video frame sequence, to obtain the action state image corresponding to the preset state image.

Fusion manners of visual features may include: connection, connection and recombination, and the like. The connection manner may connect the visual features of the plurality of preset parts together. The connection+recombination manner may rearrange and combine the connected visual features to obtain new fused visual features.

In a specific implementation, the visual features may be fused by a fusion module. Under constraint of a loss function, parameters of the fusion module may be continuously updated to obtain more satisfactory fused visual features. It is understood that this embodiment of this application does not limit a specific fusion manner of visual features.

In step 104, a connection video frame sequence is generated according to the image pair. The connection video frame sequence can achieve a connection effect and a transition effect between the preset state image and the action video frame sequence, to improve a continuity between a preset state and an action state.

The embodiments of this application can provide following technical schemes of generating a connection video frame sequence:

In technical scheme 1, the generating a connection video frame sequence may specifically include: performing pose information alignment on the preset state image and the action state image, to obtain an aligned preset state image and an aligned action state image; and generating the connection video frame sequence according to the aligned preset state image and the aligned action state image.

The pose information may represent position information or posture information of the virtual object. Performing pose information alignment on two images in an image pair can improve a matching degree between the virtual objects in the two images. In view of this, the continuity between the preset state image and the action video frame sequence can be improved.

In technical scheme 2, the generating a connection video frame sequence may specifically include: determining optical flow features separately corresponding to the preset state image and the action state image; and generating the connection video frame sequence according to the optical flow features.

An optical flow can be used for representing changes between motion images, and may characterize a motion speed of a mode in a time-varying image. When the virtual object is moving, a brightness mode of a point, corresponding to the virtual object, on an image is also moving. Therefore, the optical flow can be used for representing changes between images. Because the optical flow contains motion information of the virtual object, the optical flow can be used for determining a motion of the virtual object.

In this embodiment of this application, a first optical flow feature corresponding to the preset state image may contain motion information of an initial state of the virtual object, and a second optical flow feature corresponding to the action state image may include: motion information of an end state. Therefore, in the process of generating the connection video frame sequence, motion information of an intermediate state may be determined according to the first optical flow feature and the second optical flow feature, thus connection video frames in the connection video frame sequence can be obtained.

Therefore, in this embodiment of this application of generating the connection video frame sequence according to the optical flow features corresponding to the preset state image and the action state image separately, the continuity between the connection video frame sequence and the preset state image, and between the connection video frame sequence and the action state image can be improved, and the continuity and stability between the preset state image and the action video frame sequence can be improved.

In a specific implementation, the motion information of the intermediate state corresponding to the connection video frame may be determined according to a quantity N of the connection video frames. N may be a natural number greater than 0. A difference value between the motion information corresponding to the preset state image and the motion information corresponding to the action state image can be obtained according to the numerical value of N, and the difference value is allocated to the corresponding connection video frames, thus determining motion information of the connection video frames.

In one implementation, an optical flow processing module such as a convolution neural network or a deep neural network can be used to determine a target optical flow feature between the preset state image and the action state image. The target optical flow feature can represent the difference value between the motion information corresponding to the preset state image and the motion information corresponding to the action state image. For example, the visual features separately corresponding to the preset state image and the action state image may be input into the optical flow processing module, to obtain the target optical flow feature outputted by the optical flow processing module.

In another implementation, a speech duration corresponding to the action may be determined according to the time-dependent information. A connection duration of the connection video frame sequence is determined according to the speech duration corresponding to the action and a video duration of the action video frame sequence. Further, the quantity N of the connection video frames may be determined according to the connection duration. For example, the quantity N of the connection video frames may be determined according to the connection duration and a unit duration of the connection video frames.

In practical applications, a forward optical flow feature between the preset state image and the action state image may be obtained on the basis of the visual features in a forward order of time; a reverse optical flow feature between the preset state image and the action state image may be obtained on the basis of the visual features in a reverse order of time. Further, the target optical flow feature may be obtained according to the forward optical flow feature and the reverse optical flow feature. The target optical flow feature may be a fusion of the forward optical flow feature and the reverse optical flow feature. Then, the connection video frame sequence is generated according to the target optical flow feature. Since the forward optical flow feature and the reverse optical flow feature contain bidirectional motion information, the accuracy of the motion information can be improved. On this basis, the continuity and stability between the preset state image and the action video frame sequence can be further improved.

In a specific implementation, feature vectors corresponding to a plurality of connection video frames may be inputted to the GAN. The feature vectors may include: optical flow features. The optical flow features may reflect the motion information of the virtual object in the intermediate state. Different connection video frames may correspond to different optical flow features, so that different connection video frames may represent different motion information.

It is understood that the feature vectors may also include other features, such as a fusion result of the visual features corresponding to the preset state image and the action state image.

In technical scheme 3, the generating a connection video frame sequence may specifically include: determining optical flow features and texture features and/or deep features separately corresponding to the preset state image and the action state image; and generating the connection video frame sequence according to the optical flow features and the texture features and/or the deep features.

Based on technical scheme 2, technical scheme 3 adds the texture feature and/or the deep feature. In other words, the features for generating the connection video frame sequence specifically include: the optical flow features and the texture features, or the optical flow features and the deep features, or the optical flow features, the texture features and the deep features.

The texture features may reflect texture details of preset part such as the hairs and fingers. Applying the texture features to the generation of the connection video frame sequence can improve the naturalness of the connection video frame sequence.

The deep features may be extracted from a deep neural network. Compared with a shallow neural network, the deep neural network has better learning ability and generalization ability, so that the robustness of the generated connection video frame sequence can be improved.

Feature extraction may be performed on the basis of the foregoing visual feature (the first visual feature or the second visual feature), to obtain any one or a combination of the generation features such as the optical flow features, the texture features and the deep features.

Feature extraction is performed on the basis of the second visual feature. Since the second visual feature contains more dense information of the preset part, the generated connection video frame sequence generated in this case may also contain more dense information of the preset part. Therefore, the naturalness of the preset part in the connection video frame sequence can be improved. For example, the second visual feature contains more dense information of an arm part, so that the naturalness of the arm part in the connection video frame sequence can be improved.

When using various generation features among the optical flow features, the texture features and the deep features, the various generation features of the image pair may be fused, and the connection video frame sequence is generated according to the obtained fused feature. A fusion manner of the various generation features is similar to the fusion manner of the visual features, so it will not be repeatedly described, and may refer to the fusion manner of the visual features.

In actual applications, at least one generation feature may be inputted to the GAN to generate a connection video frame. A plurality of connection video frames are spliced according to the time sequence to obtain a corresponding connection video frame sequence.

A range of a generated video in this embodiment of this application is specifically as follows: a connection video frame sequence. The connection video frame sequence is used for achieving a connection effect and a transition effect. A specific action performing effect is presented by an action video frame sequence, so the connection video frame sequence of this embodiment of this application usually corresponds to a relatively short duration. Therefore, this embodiment of this application can reduce a time length of the generated video. Therefore, the action processing efficiency for the virtual object can be further improved.

In technical scheme 4, a global connection video frame sequence can be generated according to the preset state image and the action state image, and a local connection video frame sequence can also be generated. The local connection video frame sequence may be referred to as a part connection video frame sequence. The part connection video frame sequence may include the dense information of the preset part. Therefore, the part connection video frame sequence is added to the corresponding connection video frame sequence, which can improve the naturalness of the preset part in the connection video frame sequence.

A generation process of a part connection video frame sequence specifically includes: extracting a part preset state image from the preset state image, and determining, on the basis of three-dimensional reconstruction, a third visual feature corresponding to the part preset state image; extracting a part action state image from the action state image, and determining, on the basis of three-dimensional reconstruction, a fourth visual feature corresponding to the part action state image; and generating a part connection video frame sequence according to the third visual feature and the fourth visual feature.

The part preset state image or the part action state image corresponds to the preset part. For example, if the preset part is an arm part, a part preset state image or a part action state image corresponding to the arm part may be extracted separately.

The third visual feature or the fourth visual feature is obtained on the basis of a three-dimensional reconstruction technology, so the third visual feature or the fourth visual feature may contain more dense information of the preset part.

The process of generating the part connection video frame sequence is similar to the process of generating the connection video frame sequence, and details may refer to any one or a combination of technical scheme 1 or technical scheme 3.

For example, the process of generating the part connection video frame sequence may include: first, performing pose information alignment on the preset state image and the action state image; performing feature extraction on the basis of the third visual feature, to obtain any one or a combination of the optical flow features, the texture features, the deep features and other third generation features; performing feature extraction on the basis of the fourth visual feature, to obtain any one or a combination of the optical flow features, the texture features, the deep features and other fourth generation features; and generating the part connection video frame sequence according to the third generation features and the fourth generation features.

A corresponding adding manner of adding the part connection video frame sequence to the connection video frame sequence may include: attaching the part connection video frame sequence to the corresponding connection video frame sequence. It is understood that this embodiment of this application does not limit a specific adding manner.

The process of generating the connection video frame sequence is described in detail above through technical scheme 1 to technical scheme 4. It is understood that persons skilled in the art can use any one or a combination of technical scheme 1 to technical scheme 4 according to actual application requirements. This embodiment of this application does not limit a specific process of generating the connection video frame sequence.

In step 105, the connection video frame sequence and the action video frame sequence may be spliced according to the time sequence. The obtained spliced video frame sequence may correspond to the speech sequence corresponding to the text content. For example, the spliced video frame sequence and the speech sequence corresponding to the text content can be aligned in time axis to achieve synchronous playing.

In conclusion, in a case of determining a preset state image of the virtual image at target time and an action video frame sequence corresponding to an action identifier, the method for processing an action of the virtual object of this embodiment of this application determines an image pair corresponding to the preset state image and the action state image which are matched with each other, and generates a connection video frame sequence according to the image pair. The connection video frame sequence can achieve a connection effect and a transition effect between the preset state image and the action video frame sequence, to improve a continuity between a preset state and an action state. Further, the connection video frame sequence is spliced with the action video frame sequence, so that a corresponding action video can be obtained.

By applying the technical solutions of the embodiments of this application, a user can trigger corresponding action instructions by inputting the action identifier and the time-dependent information. Inputting the action identifier and the time-dependent information can reduce a time cost and an operation difficulty of the user, so that the action processing efficiency for the virtual object can be improved.

In addition, the embodiments of this application generate the connection video frame sequence that achieves the connection effect and the transition effect in case of determining the preset state image and the action video frame sequence. Since the action video frame sequence can be from pre-collected and pre-stored action videos, a range of the generated video is specifically the connection video frame sequence, so the embodiments of this application can reduce a time length of the generated video. Therefore, the action processing efficiency for the virtual object can be further improved.

A method for processing an action of a virtual object according to another embodiment of this application may specifically include: preprocessing, matching and generation.

(1) Preprocessing:

The preprocessing procedure is used for preprocessing an action state image in an action video, to obtain corresponding action state visual features.

In a specific implementation, the action video may be collected in advance according to an action identifier, and the collected action video and its corresponding action identifier are stored to an action video library.

Figure 2:
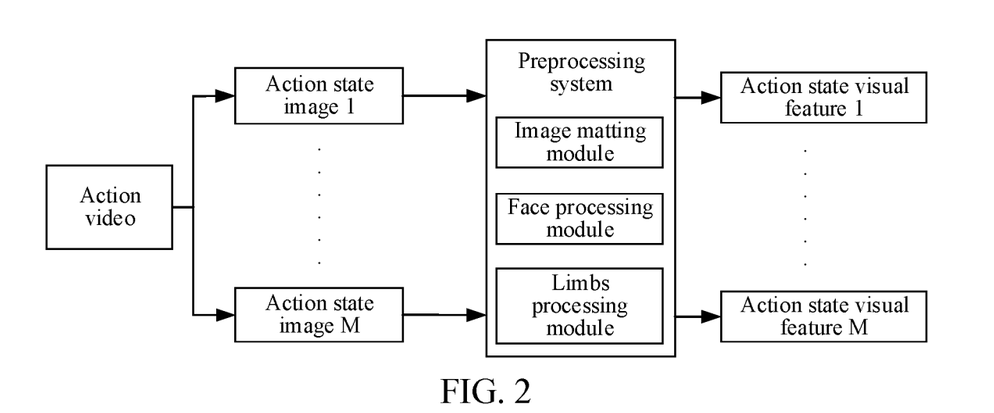
FIG. 2 is a schematic flowchart of preprocessing an action video provided by an embodiment of this application.

FIG. 2 shows a schematic flowchart of preprocessing an action video provided by an embodiment of this application. In FIG. 2, M action state images such as an action state image 1, an action state image 2, . . . , an action state image M may be extracted from the action video, and the M action state images are separately inputted to a corresponding preprocessing system. The preprocessing system outputs corresponding action state visual features which are represented by an action state visual feature 1, an action state visual feature 2, . . . , and an action state visual feature M in FIG. 2.

The preprocessing system specifically includes: an image matting module, a face processing module and a limbs processing module.

The image matting module is configured to extract a region image corresponding to the virtual object from the action state images by using an image matting technology. For example, the region image includes: a face region image and a limbs region image.

The face processing module is configured to extract the action state visual features of a preset part such as the lip, the noise and the eyes from the face region image.

The limbs processing module is configured to extract the action state visual features of a preset part such as the four limbs from the limbs region image.

The face processing module or the limbs processing module can further perform three-dimensional reconstruction on the images of the preset part according to the extracted action state visual feature of the preset part, to obtain a dense action state visual feature of the preset part.

(2) Matching.

The matching procedure is used for matching the preset state image with the action state images, to obtain a corresponding image pair.

Figure 3:
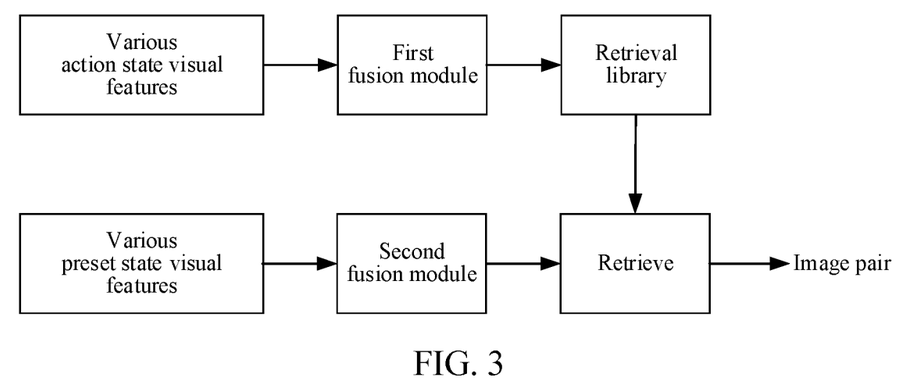
FIG. 3 is a schematic flowchart of matching of a preset state image and an action state image provided by an embodiment of this application.

FIG. 3 shows a schematic flowchart of matching of a preset state image and an action state image provided by an embodiment of this application.

In FIG. 3, a first fusion module may be used to fuse various action state visual features corresponding to a single action state image, to obtain a first fused visual feature, and store the first fused visual feature corresponding to the single action state image to a retrieval library.

When receiving an action instruction, an action video frame sequence corresponding to an action identifier in the action instruction may be determined. For example, an action video library is searched according to the action identifier for a target action video identifier, and a plurality of action state images corresponding to the target action video identifier are used as the action video frame sequence.

In practical applications, a preset state image of the virtual object at target time may also be determined according to time-dependent information in the action instruction. Furthermore, a preset state visual feature corresponding to the preset state image may be determined. A determining process of the preset state visual feature is similar to the determining process of the action state visual features, so it will not be repeatedly described here and may refer to the determining process of the action state visual features. For example, the determining process of the preset state visual feature may specifically include: inputting the preset state image to a corresponding preprocessing system which outputs the corresponding preset state visual feature.

In FIG. 3, a second fusion module may be used to fuse various preset state visual features corresponding to the preset state image, to obtain a second fused visual feature.

In FIG. 3, the retrieval library may be retrieved according to the first fused visual feature corresponding to the preset state image, to obtain an action state image that matches the preset state image. Specifically, the first fused visual feature may be matched with the second fused visual features of the plurality of action state images corresponding to the target action video identifier, and an action state image with a maximum match value is used as the action state image corresponding to the preset state image. The preset state image and the action state image corresponding to the preset state image may be used as an image pair.

(3) Generation.

The generation procedure is used for generating a connection video frame sequence according to the image pair.

Figure 4:
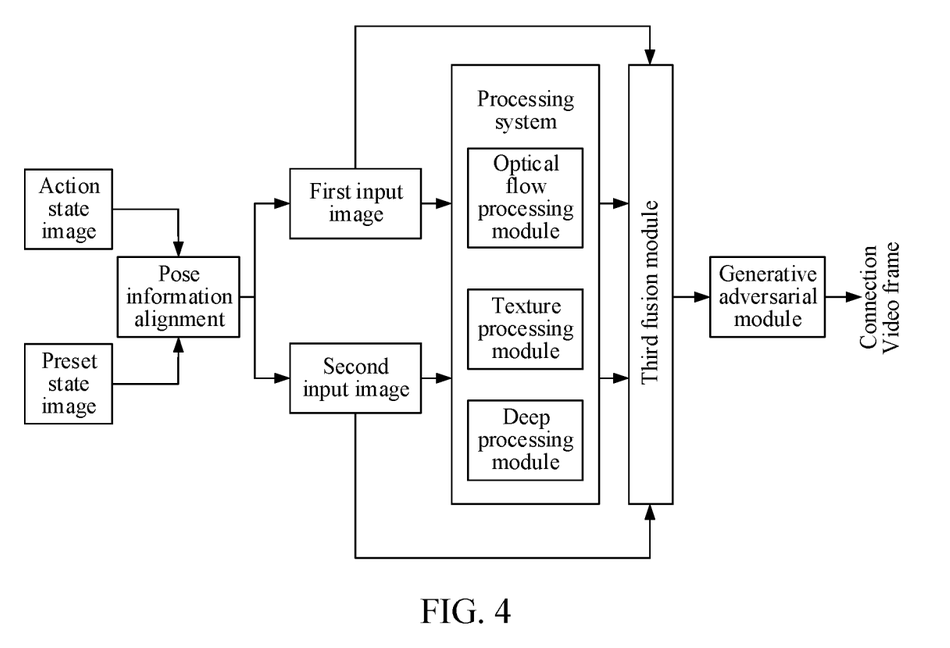
FIG. 4 is a schematic flowchart of generating a connection video frame sequence provided by an embodiment of this application.

FIG. 4 shows a schematic flowchart of generating a connection video frame sequence provided by an embodiment of this application.

In FIG. 4, pose information alignment may be performed on the image pair, to obtain a first input image after alignment and a second input image after alignment.

The first input image and the second input image are separately inputted into a processing system. The processing system may be configured to perform feature extraction on the basis of the foregoing visual features (the preset state visual feature and the action state visual features), to obtain optical flow features, texture features, deep features and other generation features.

The processing system may specifically include: an optical flow processing module, a texture processing module and a deep processing module.

The optical flow processing module is configured to obtain the optical flow feature between the preset state image and the action state image on the basis of the visual features. Specifically, a forward optical flow feature between the preset state image and the action state image may be obtained on the basis of the visual features in a forward order of time; and a reverse optical flow feature between the preset state image and the action state image may be obtained on the basis of the visual features in a reverse order of time.

The texture processing module is configured to separately obtain the texture features corresponding to the preset state image and the action state image on the basis of the visual features. The texture features may reflect texture details of the preset part such as the hairs and a finger.

The deep processing module is configured to separately obtain deep features corresponding to the preset state image and the action state image on the basis of the visual features. A deep neural network has better learning ability and generalization ability, so that the robustness of the generated connection video frame sequence can be improved.

Further, the various generation features such as the optical flow features, the texture features and the deep features outputted by the processing system may be inputted to a third fusion module, and the third fusion module fuses the various generation features, to obtain a corresponding fused feature. Inputs of the third fusion module may further include: a first input image and a second input image. The first input image and the second input image can achieve a monitoring effect on the third fusion module.

The first fusion module, the second fusion module or the third fusion module of this embodiment of this application may be specific examples of a fusion module. In a specific implementation, the fusion module may be a neural network. It is understood that this embodiment of this application does not limit a specific structure of the fusion module.

Further, the fused feature outputted by the third fusion module may be inputted to a GAN, and the GAN generates corresponding connection video frames according to the fused feature.

The fused feature may include fusion information of the preset state image and the action state image. In some embodiments, the fused feature may include: feature vectors separately corresponding to a plurality of connection video frames. The feature vectors may include: optical flow features, texture features and deep features. The optical flow features may reflect the motion information of the virtual object in the intermediate state. Different connection video frames correspond to different optical flow features, so that different connection video frames may represent different motion information. The texture features in the feature vectors may be a fusion of the texture features corresponding to the preset state image and the action state image. The deep features in the feature vectors may be a fusion of the deep features corresponding to the preset state image and the action state image.

It is understood that the feature vectors may also include other features, such as a fusion result of the visual features corresponding to the preset state image and the action state image.

In a specific implementation, a plurality of connection video frames outputted by the GAN are spliced according to the time sequence to obtain a corresponding connection video frame sequence. Further, the connection video frame sequence and the action video frame sequence may be further spliced, and an obtained spliced video frame sequence may correspond to the speech sequence corresponding to the text content. For example, the spliced video frame sequence and the speech sequence corresponding to the text content can be aligned in time axis to achieve synchronous playing.

The foregoing method embodiments are expressed as a series of action combinations for the purpose of brief description, but persons of ordinary skill in the art know that because some steps may be performed in other sequences or simultaneously according to the embodiments of this application, the embodiments of this application are not limited to a described action sequence. In addition, persons skilled in the art also know that the embodiments described in this specification are all preferred embodiments; and actions involved are not necessarily mandatory in the embodiments of this application.

Figure 5:
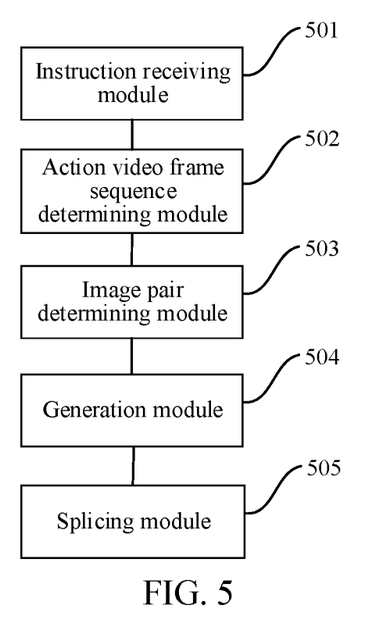
FIG. 5 is a structural block diagram of an apparatus for processing an action of a virtual object provided by an embodiment of this application.

FIG. 5 shows a structural block diagram of an apparatus for processing an action of a virtual object provided by an embodiment of this application. The apparatus may specifically include:

an instruction receiving module 501, configured to receive an action instruction, the action instruction including: an action identifier and time-dependent information of performing an action associated with the action identifier;

an action video frame sequence determining module 502, configured to determine an action video frame sequence corresponding to the action identifier;

an image pair determining module 503, configured to determine, from the action video frame sequence according to a preset state image of a virtual object at target time, an action state image corresponding to the preset state image, the target time being determined according to the time-dependent information;

a generation module 504, configured to generate a connection video frame sequence according to the preset state image and the action state image, the connection video frame sequence being used for connecting the preset state image with the action video frame sequence; and a splicing module 505, configured to splice the connection video frame sequence with the action video frame sequence, to obtain an action video.

In some embodiments, the generation module 504 may include:

a first feature determining module, configured to determine optical flow features separately corresponding to the preset state image and the action state image; and a first generation module, configured to generate the connection video frame sequence according to the optical flow features.

In some embodiments, the generation module 504 may include:

a second feature determining module, configured to determine optical flow features and texture features and/or deep features separately corresponding to the preset state image and the action state image; and a second generation module, configured to generate the connection video frame sequence according to the optical flow features and the texture features and/or the deep features.

In some embodiments, the image pair determining module 503 may include:

a matching module, configured to match a visual feature corresponding to the preset state image with visual features corresponding to action state images in the action video frame sequence, to obtain the action state image corresponding to the preset state image.

In some embodiments, the apparatus may further include:

a region image determining module, configured to determine a region image corresponding to the virtual object from the preset state image or the action state image; and an extraction module, configured to extract a visual feature of a preset part from the region image as the visual feature corresponding to the preset state image or the action state image.

In some embodiments, the apparatus may further include:

a three-dimensional reconstruction module, configured to perform three-dimensional reconstruction on an image of the preset part according to the extracted visual feature of the preset part, to obtain a dense visual feature of the preset part, where the dense visual feature of the preset part is used as the visual feature corresponding to the preset state image or the action state image.

In some embodiments, the generation module 504 may include:

an alignment module, configured to perform pose information alignment on the preset state image and the action state image, to obtain an aligned preset state image and an aligned action state image; and a third generation module, configured to generate the connection video frame sequence according to the aligned preset state image and the aligned action state image.

In some embodiments, the apparatus may further include:

a third visual feature determining module, configured to: extract a part preset state image from the preset state image, and determine, on the basis of three-dimensional reconstruction, a third visual feature corresponding to the part preset state image;

a fourth visual feature determining module, configured to: extract a part action state image from the action state image, and determine, on the basis of three-dimensional reconstruction, a fourth visual feature corresponding to the part action state image;

a fourth generation module, configured to generate a part connection video frame sequence according to the third visual feature and the fourth visual feature; and an adding module, configured to add the part connection video frame sequence to the corresponding connection video frame sequence.

In some embodiments, the time-dependent information may include: text information corresponding to the action identifier.

The apparatus embodiment is basically similar to the method embodiment, and therefore is described briefly. For related parts, refer to partial descriptions in the method embodiment.

The embodiments in this specification are all described in a progressive manner. Descriptions of each embodiment focus on differences from other embodiments, and same or similar parts among respective embodiments may be mutually referenced.

The specific manners of performing operations by the various modules of the apparatuses in the foregoing embodiments are described in detail in the embodiments related to the methods, and are not further described in detail herein.

Figure 6:
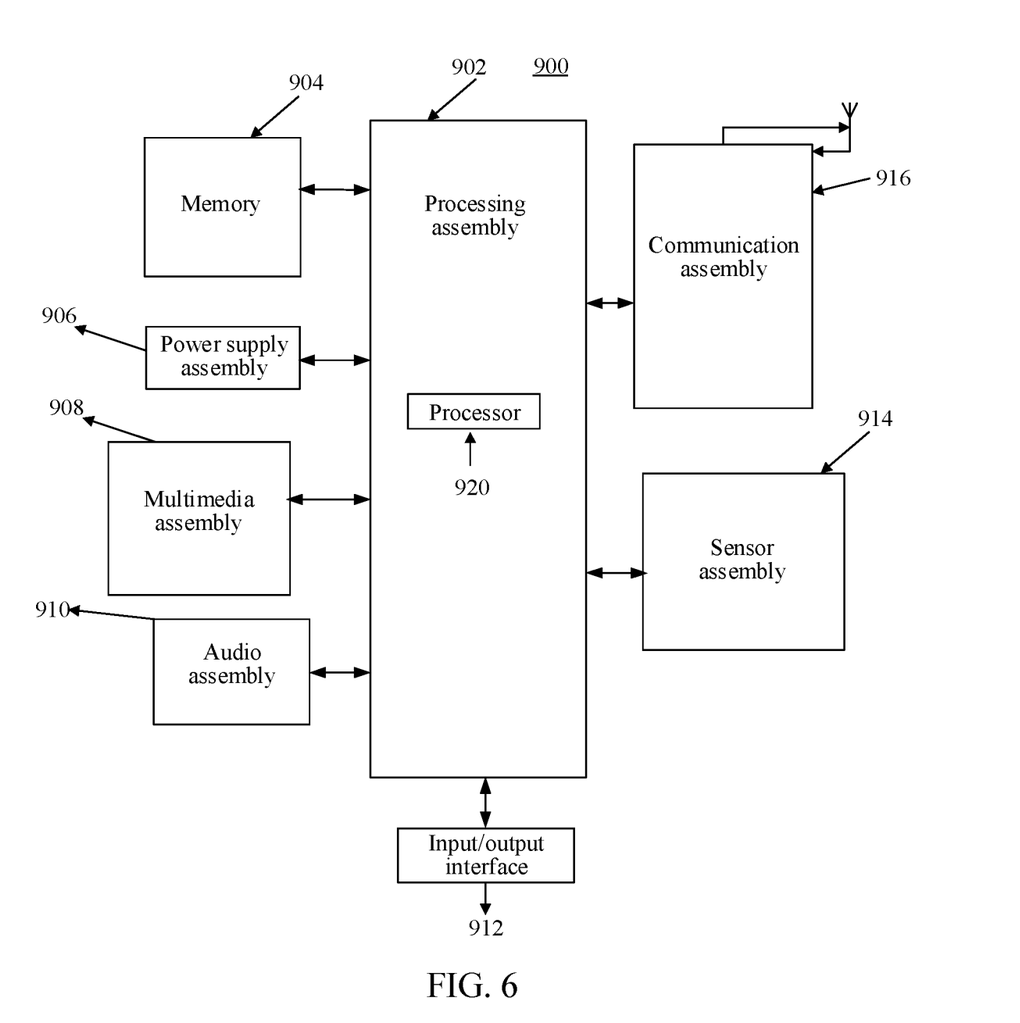
FIG. 6 is a structural block diagram of an apparatus for processing an action of a virtual object provided by an embodiment of this application.

FIG. 6 is a structural block diagram of an apparatus for processing an action of a virtual object according to an exemplary embodiment. The apparatus may be referred to as a computer device. For example, the apparatus 900 may be a mobile phone, a computer, a digital broadcasting terminal, a message receiving and transmitting device, a game console, a tablet device, a medical device, a fitness facility, a personal digital assistant, and other terminal devices, or may be a server.

Referring to FIG. 6, the apparatus 900 may include one or more assemblies below: a processing assembly 902, a memory 904, a power supply assembly 906, a multimedia assembly 908, an audio assembly 910, an input/output (I/O) interface 912, a sensor assembly 914, and a communication assembly 916.

The processing assembly 902 usually controls the whole operation of the apparatus 900, such as operations associated with displaying, an incoming call, data communication, a camera operation, and a recording operation. The processing assembly 902 may include one or more processors 920 to execute instructions, to complete all or some steps of the foregoing method. In addition, the processing assembly 902 may include one or more modules, to facilitate the interaction between the processing assembly 902 and other assemblies. For example, the processing assembly 902 may include a multimedia module, to facilitate the interaction between the multimedia assembly 908 and the processing assembly 902.

The memory 904 is configured to store various types of data to support the operations on the apparatus 900. Examples of the data include instructions, contact data, phonebook data, messages, pictures, videos, and the like of any application programs or methods used to be operated on the apparatus 900. The memory 904 can be implemented by any type of volatile or non-volatile storage devices or a combination thereof, such as a static random access memory (SRAM), an electrically erasable programmable read-only memory (EPROM), a programmable read-only memory (PROM), a read-only memory (ROM), a magnetic memory, a flash memory, a magnetic disc, or an optical disc.

The power supply assembly 906 provides power to the various assemblies of the apparatus 900. The power supply assembly 906 may include a power management system, one or more power supplies, and other assemblies associated with generating, managing and allocating power for the apparatus 900.

The multimedia assembly 908 includes a screen providing an output interface between the apparatus 900 and a user. In some embodiments, the screen may include a liquid crystal display (LCD) and a touch panel (TP). If the screen includes a TP, the screen may be implemented as a touch screen, to receive an input signal from the user. The TP includes one or more touch sensors to sense touching, sliding, and gestures on the TP. The touch sensor may not only sense the boundary of touching or sliding actions, but also detect duration and pressure related to the touching or sliding operations. In some embodiments, the multimedia assembly 908 includes a front camera and/or a rear camera. When the apparatus 900 is in an operation mode, such as an image capturing mode or a video mode, the front camera and/or the rear camera may receive external multimedia data. Each front camera and rear camera may be a fixed optical lens system or have a focal length and an optical zooming capability.

The audio assembly 910 is configured to output and/or input an audio signal. For example, the audio assembly 910 includes a microphone (MIC), and when the apparatus 900 is in an operation mode, such as a call mode, a recording mode, and a voice identification mode, the MIC is configured to receive an external audio signal. The received audio signal may be further stored in the memory 904 or sent through the communication assembly 916. In some embodiments, the audio assembly 910 further includes a loudspeaker, configured to output an audio signal.

The I/O interface 912 provides an interface between the processing assembly 902 and an external interface module. The external interface module may be a keyboard, a click wheel, buttons, or the like. These buttons may include, but are not limited to: a homepage button, a volume button, a start-up button, and a locking button.

The sensor assembly 914 includes one or more sensors, configured to provide status evaluation in each aspect to the apparatus 900. For example, the sensor assembly 914 may detect an on/off status of the apparatus 900, and relative positioning of the assemblies. For example, the assembly is a display and a small keyboard of the apparatus 900. The sensor assembly 914 may further detect a position change of the apparatus 900 or one assembly of the apparatus 900, the existence or nonexistence of contact between the user and the apparatus 900, an azimuth or acceleration/deceleration of the apparatus 900, and a temperature change of the apparatus 900. The sensor assembly 914 may include a proximity sensor, configured to detect the existence of nearby objects without any physical contact. The sensor assembly 914 may further include an optical sensor, such as a CMOS or CCD image sensor, that is used in an imaging application. In some embodiments, the sensor assembly 914 may further include an acceleration sensor, a gyroscope sensor, a magnetic sensor, a pressure sensor, or a temperature sensor.

The communication assembly 916 is configured to facilitate communication in a wired or wireless manner between the apparatus 900 and other devices. The apparatus 900 may access a wireless network based on communication standards, such as Wi-Fi, 2G, or 3G, or a combination thereof. In an exemplary embodiment, the communication assembly 916 receives a broadcast signal or broadcast related information from an external broadcast management system via a broadcast channel. In an exemplary embodiment, the communication assembly 916 further includes a near field communication (NFC) module, to promote short range communication. For example, the NFC module may be implemented based on a radio frequency identification (RFID) technology, an infra-red data association (IrDA) technology, an ultra-wideband (UWB) technology, a Bluetooth (BT) technology, and other technologies.

In an exemplary embodiment, the apparatus 900 can be implemented as one or more application specific integrated circuits (ASICs), a digital signal processor (DSP), a digital signal processing device (DSPD), a programmable logic device (PLD), a field programmable gate array (FPGA), a controller, a micro-controller, a microprocessor or other electronic elements, so as to implement the above method.

In an exemplary embodiment, a non-transitory computer-readable storage medium including instructions, for example, the memory 904 including instructions, is further provided, and the foregoing instructions may be executed by a processor 920 of the apparatus 900 to complete the foregoing method. For example, the non-transitory computer-readable storage medium may be a read-only memory (ROM), a random access memory (RAM), a CD-ROM, a magnetic tape, a floppy disk, an optical data storage device, or the like.

Figure 7:
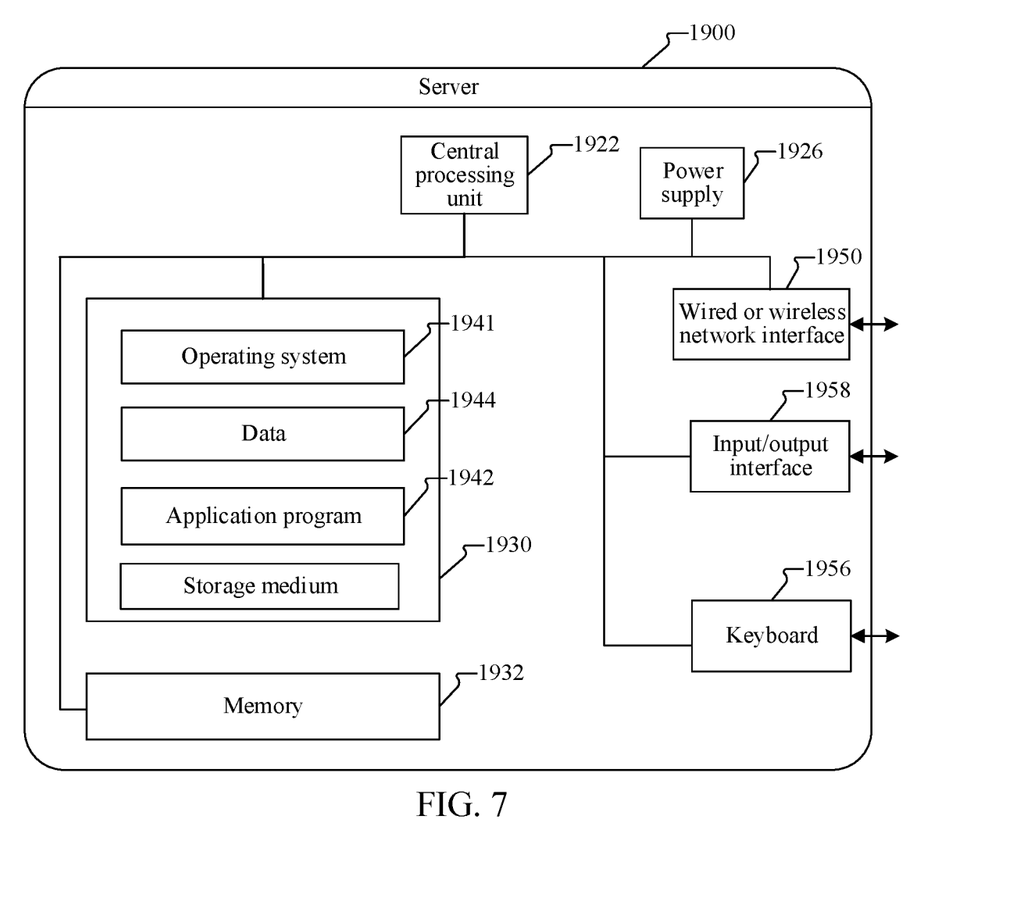
FIG. 7 is a structural block diagram of a server in some embodiments of this application.

FIG. 7 is a structural block diagram of a server in some embodiments of this application. The server 1900 may vary greatly due to different configurations or performance, and may include one or more central processing units (CPUs) 1922 (for example, one or more processors), a memory 1932, and one or more storage media 1930 (for example, one or more mass storage devices) that store application programs 1942 or data 1944. The memories 1932 and the storage media 1930 may be used for transitory storage or permanent storage. A program stored in the storage medium 1930 may include one or more modules (which are not shown in the figure), and each module may include a series of instruction operations on the server. Further, the CPU 1922 may be configured to communicate with the storage medium 1930, and perform, on the server 1900, the series of instruction operations in the storage medium 1930.

The server 1900 may further include one or more power supplies 1926, one or more wired or wireless network interfaces 1950, one or more input/output interfaces 1958, one or more keyboards 1956, and/or, one or more operating systems 1941, for example, Windows Server™, Mac OS X™, Unix™, Linux™, and FreeBSD™.

When the instructions in the storage medium is executed by the processor of the apparatus (the device or the server), the non-transitory computer-readable storage medium enables the apparatus to implement a method for processing an action of a virtual object. The method includes: receiving an action instruction, the action instruction including: an action identifier and time-dependent information of performing an action associated with the action identifier; determining an action video frame sequence corresponding to the action identifier; determining, from the action video frame sequence according to a preset state image of a virtual object at target time, an action state image corresponding to the preset state image, the target time being determined according to the time-dependent information; generating a connection video frame sequence according to the preset state image and the action state image, the connection video frame sequence being used for connecting the preset state image with the action video frame sequence; and splicing the connection video frame sequence with the action video frame sequence, to obtain an action video.

After considering the specification and practicing the present disclosure, persons skilled in the art may easily conceive of other implementations of this application. This application is intended to cover any variation, use, or adaptive change of this application. These variations, uses, or adaptive changes follow the general principles of this application and include common general knowledge or common technical means, which are not disclosed in the present disclosure, in the art. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

The foregoing descriptions are merely preferred embodiments of this application, and are not intended to limit this application. Any modification, equivalent replacement, improvement and the like made within the spirit and principle of this application shall fall within the protection scope of this application.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The method for processing an action of a virtual object, an apparatus for processing an action of a virtual object, and an apparatus for processing an action of a virtual object according to this application are described in detail. Specific examples are used herein to illustrate the principles and implementations of this application. The descriptions of the above embodiments are only to help understand the method of this application and a core idea of the method. In addition, persons of ordinary skill in the art will make changes to all specific implementations and application ranges according to the idea of this application. In conclusion, the content of this specification shall not be understood as a limitation on this application.

What is claimed is:

1. A method for processing an action of a virtual object performed by a computer device, the method comprising:
    receiving an action instruction, the action instruction comprising: an action identifier and time-dependent information of performing an action associated with the action identifier;
    determining, among a plurality of pre-generated action video frame sequences, each action video frame sequence corresponding to an action performed by the virtual object and having a corresponding action identifier, an action video frame sequence corresponding to the action identifier;
    determining, from the action video frame sequence, an action state image corresponding to a preset state image of the virtual object at a target time, the target time being determined according to the time-dependent information, further including:
        comparing a visual feature corresponding to the preset state image with a visual feature corresponding to a candidate action state image in the action video frame sequence to obtain a match value between the preset state image and the candidate action state image; and
        choosing the candidate action state image having a maximum match value with the preset state image as the action state image corresponding to the preset state image of the virtual object at the target time;
    obtaining a pair of images including an aligned preset state image and an aligned action state image by performing pose information alignment on the preset state image and the action state image that further improves a matching degree between the virtual object in the preset state image and the virtual object in the action state image;
    generating a connection video frame sequence according to the aligned preset state image and the aligned action state image, the connection video frame sequence representing a transition from a preset state corresponding to the preset state image to an action state corresponding to the action state image and connecting the preset state image with the action video frame sequence; and
    splicing the connection video frame sequence with the action video frame sequence, to obtain an action video.

2. The method according to claim 1, wherein the generating a connection video frame sequence according to the action state image comprises:
    determining optical flow features separately corresponding to the action state image; and
    generating the connection video frame sequence according to the optical flow features.

3. The method according to claim 1, wherein the generating a connection video frame sequence according to the action state image comprises:
    determining optical flow features and texture features and/or deep features separately corresponding to the action state image; and generating the connection video frame sequence according to the optical flow features and the texture features and/or the deep features.

4. The method according to claim 1, wherein the pose information includes position information and posture information of the virtual object in the preset state image and the action state image.

5. The method according to claim 1, further comprising:
extracting a part preset state image from the preset state image, and determining, on the basis of three-dimensional reconstruction, a third visual feature corresponding to the part preset state image;
extracting a part action state image from the action state image, and determining, on the basis of three-dimensional reconstruction, a fourth visual feature corresponding to the part action state image;
generating a part connection video frame sequence according to the third visual feature and the fourth visual feature; and
adding the part connection video frame sequence to the connection video frame sequence.

6. The method according to claim 1, wherein the time-dependent information comprises: text information corresponding to the action identifier.

7. A computer device, comprising a processor and a memory, the memory storing a program, the program, when executed by the processor, causing the computer device to perform a method for processing an action of a virtual object including:
receiving an action instruction, the action instruction comprising: an action identifier and time-dependent information of performing an action associated with the action identifier;
determining, among a plurality of pre-generated action video frame sequences, each action video frame sequence corresponding to an action performed by the virtual object and having a corresponding action identifier, an action video frame sequence corresponding to the action identifier;
determining, from the action video frame sequence, an action state image corresponding to a preset state image of the virtual object at a target time, the target time being determined according to the time-dependent information, further including:
comparing a visual feature corresponding to the preset state image with a visual feature corresponding to a candidate action state image in the action video frame sequence to obtain a match value between the preset state image and the candidate action state image; and
choosing the candidate action state image having a maximum match value with the preset state image as the action state image corresponding to the preset state image of the virtual object at the target time;
obtaining a pair of images including an aligned preset state image and an aligned action state image by performing pose information alignment on the preset state image and the action state image that further improves a matching degree between the virtual object in the preset state image and the virtual object in the action state image;
generating a connection video frame sequence according to the aligned preset state image and the aligned action state image, the connection video frame sequence representing a transition from a preset state corresponding to the preset state image to an action state corresponding to the action state image and connecting the preset state image with the action video frame sequence; and
splicing the connection video frame sequence with the action video frame sequence, to obtain an action video.

8. The computer device according to claim 7, wherein the generating a connection video frame sequence according to the action state image comprises:
determining optical flow features separately corresponding to the action state image; and
generating the connection video frame sequence according to the optical flow features.

9. The computer device according to claim 7, wherein the generating a connection video frame sequence according to the action state image comprises:
determining optical flow features and texture features and/or deep features separately corresponding to the action state image; and
generating the connection video frame sequence according to the optical flow features and the texture features and/or the deep features.

10. The computer device according to claim 7, wherein the pose information includes position information and posture information of the virtual object in the preset state image and the action state image.

11. The computer device according to claim 7, wherein the method further comprises:
extracting a part preset state image from the preset state image, and determining, on the basis of three-dimensional reconstruction, a third visual feature corresponding to the part preset state image;
extracting a part action state image from the action state image, and determining, on the basis of three-dimensional reconstruction, a fourth visual feature corresponding to the part action state image;
generating a part connection video frame sequence according to the third visual feature and the fourth visual feature; and
adding the part connection video frame sequence to the connection video frame sequence.

12. The computer device according to claim 7, wherein the time-dependent information comprises: text information corresponding to the action identifier.

13. A non-transitory computer-readable storage medium, which stores a program, the program, when executed by one or more processors, causing the computer device to perform a method for processing an action of a virtual object including:
receiving an action instruction, the action instruction comprising: an action identifier and time-dependent information of performing an action associated with the action identifier;
determining, among a plurality of pre-generated action video frame sequences, each action video frame sequence corresponding to an action performed by the virtual object and having a corresponding action identifier, an action video frame sequence corresponding to the action identifier;
determining, from the action video frame sequence, an action state image corresponding to a preset state image of the virtual object at a target time, the target time being determined according to the time-dependent information, further including:
comparing a visual feature corresponding to the preset state image with a visual feature corresponding to a candidate action state image in the action video frame sequence to obtain a match value between the preset state image and the candidate action state image; and choosing the candidate action state image having a maximum match value with the preset state image as the action state image corresponding to the preset state image of the virtual object at the target time;

obtaining a pair of images including an aligned preset state image and an aligned action state image by performing pose information alignment on the preset state image and the action state image that further improves a matching degree between the virtual object in the preset state image and the virtual object in the action state image;

generating a connection video frame sequence according to the aligned preset state image and the aligned action state image, the connection video frame sequence representing a transition from a preset state corresponding to the preset state image to an action state corresponding to the action state image and connecting the preset state image with the action video frame sequence; and splicing the connection video frame sequence with the action video frame sequence, to obtain an action video.

14. The non-transitory computer-readable storage medium according to claim 13, wherein the generating a connection video frame sequence according to the action state image comprises:

determining optical flow features separately corresponding to the action state image; and generating the connection video frame sequence according to the optical flow features.

15. The non-transitory computer-readable storage medium according to claim 13, wherein the generating a connection video frame sequence according to the action state image comprises:

determining optical flow features and texture features and/or deep features separately corresponding to the action state image; and generating the connection video frame sequence according to the optical flow features and the texture features and/or the deep features.

16. The non-transitory computer-readable storage medium according to claim 13, wherein the pose information includes position information and posture information of the virtual object in the preset state image and the action state image.

17. The non-transitory computer-readable storage medium according to claim 13, wherein the method further comprises:

extracting a part preset state image from the preset state image, and determining, on the basis of three-dimensional reconstruction, a third visual feature corresponding to the part preset state image;

extracting a part action state image from the action state image, and determining, on the basis of three-dimensional reconstruction, a fourth visual feature corresponding to the part action state image;

generating a part connection video frame sequence according to the third visual feature and the fourth visual feature; and adding the part connection video frame sequence to the connection video frame sequence.

* * * * *